Jan. 20, 1959 L. SCHWARTZ Re. 24,591

MATTRESS COVER AND METHOD OF MAKING SAME

Original Filed May 17, 1956

INVENTOR:
LOUIS SCHWARTZ

BY

AGENT

United States Patent Office

Re. 24,591
Reissued Jan. 20, 1959

24,591

MATTRESS COVER AND METHOD OF MAKING SAME

Louis Schwartz, Hewlett, N. Y.

Original No. 2,838,772, dated June 17, 1958, Serial No. 585,515, May 17, 1956. Application for reissue October 8, 1958, Serial No. 766,152

10 Claims. (Cl. 5—354)

Matter enclosed in heavy brackets [ ] appears in the original patent but forms no part of this reissue specification; matter printed in italics indicates the additions made by reissue.

This invention relates to improvements in covers for mattresses, sofa pillows and the like [, as well as to a method of making such covers].

An object of my invention is to provide a simple cover which closely follows the contours of a mattress or other article of upholstery of substantially prismatic shape and is positively dustproof at the joints.

Another object of this invention is to provide a cover having means for facilitating the fitting of the cover over the bulky body of a mattress or the like.

A feature of my invention resides in the provision of a cover of the above character with box corners formed by inwardly folded integral flaps which insure a snug fit but will not leave the mattress or other protected article exposed if their stitching or equivalent fastening means should be destroyed by continuous wear and tear. This feature renders the cover particularly suitable for use in hospitals, military installations, hotels or other institutions where repeated replacement of bedding is customary and desirable.

The cover is particularly suitable for fitting over sharp-cornered mattresses or pillows not easily accommodated by seamless cases of conventional design. It may be manufactured of a knitted or woven fabric, a plastic, a plastic-coated fabric or other suitable material to render it dustproof and/or waterproof. The seams are preferably applied internally and are thus hidden from view when the article is fitted over a mattress or pillow to improve its appearance and to reduce the wear and tear on the threads.

A more particular aspect of the invention resides in a novel formation of transverse edges laterally of the rear closed end of the cover and laterally of the open front or receiving end thereof. The free edges of the panels which surround the receiving aperture are provided with conventional closure means, such as the two halves of a slide fastener, for ready closing or opening of the article. The corners at the receiving end of the cover are formed by spreading the material adjacent each end of the fastener to a width equaling the thickness of the article, rearwardly folding a triangular portion whose apex is at a respective end of the entrance slot, and completing the formation of a triangular flap by a seam of V-shape preferably running wholly inside the cover. The resulting flap forms a convenient handgrip member for drawing the cover over a large article of upholstery.

The edges at the rear, closed end of the cover are formed by providing an internal triangular pocket adjacent the lateral ends of the rear edge; the length of the vertical pocket mouth equals the thickness of the mattress or pillow, and the pocket is then closed by applying a transverse row of stitches, again preferably wholly concealed, to the meeting edges of the cover material.

Other features and advantages of the cover according to my invention will become apparent in the course of the following detailed description of one preferred embodiment illustrated in the accompanying drawing, in which.

Figure 1:
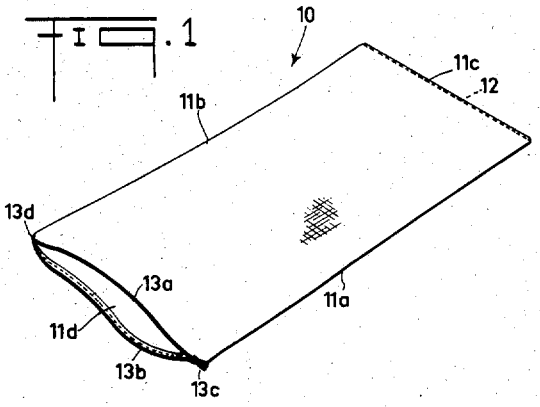
Fig. 1 is a perspective view of a rectangular mattress or pillow cover, according to the invention, prior to the forming of corners.
Figure 2:
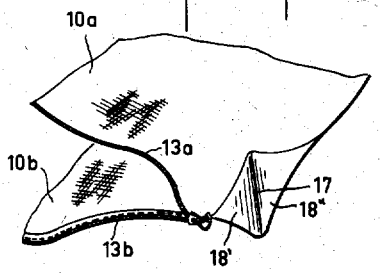
Fig. 2 is a fragmentary perspective view illustrative of the first step in forming the flaps at the receiving or front end of the cover.
Figure 3:
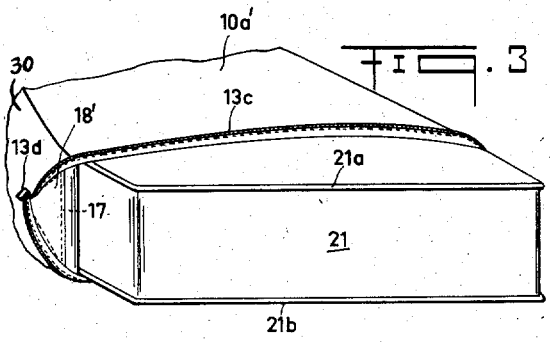
Fig. 3 is a perspective view of the mattress with the finished cover partially fitted thereover.
Figure 4:
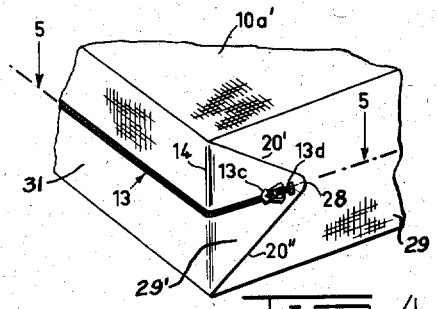
Fig. 4 is a fragmentary perspective view of the closed receiving end of the finished cover fitted over a mattress.
Figure 5:
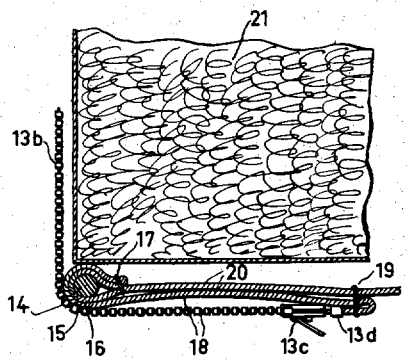
Fig. 5 is a section taken on line 5—5 in Fig. 4.

A semi-finished bag-shaped cover 10 is shown in Fig. 1 as including an upper section 10a and a lower section 10b. The cover is preferably woven in tubular form, i. e. without a seam along the longitudinal edges 11a and 11b whereby the sections 10a, 10b are integral and originally indistinguishable from each other, and is closed at its rear edge 11c by an internal seam 12 (best seen in Fig. 7). The front end 11d of the cover is open, the free upper and lower marginal edges of the respective sections 10a, 10b carrying slide-fastener halves 13a, 13b which may be interlaced between stops 13d by a conventional slider 13c. In forming the vertical edge 14, the portion adjacent the slide-fastener stop 13d is spread to a width equaling the thickness of the article to be protected by the cover, such as a mattress 21, and a short piece 15 of flexible reinforcing material, such as a wrapping cord, is inserted in an internal fold 16 obtained by tucking in the material of the cover and fastening it by a vertical seam 17 (see Figs. 2, 3, 5 and 7). Seam 17 defines a diagonal of a diamond-shaped area (see Fig. 2) whose two triangular halves 18', 18'' are then doubled up by folding around this seam, triangular 18' and short portions of slide-fastener halves 13a, 13b being folded rearwardly around the flexible member 15 to form an inner flap 18 (Fig. 8) which is held in shape by stitching 19' and 19'' Although these stitches preferably do not penetrate the outer cover wall, the outline of triangular flap 18 is visible from without as edge 14 and joints 20', 20'' (see Fig. 4) which define a triangular area 29' on a side panel 29. The side panel 29, an opposite side panel 30 (Fig. 3), a front panel 31 and a rear panel 32 are all formed by marginal portions of cover sections 10a, 10b whose central portions constitute an upper panel 10a' and a lower panel 10b', respectively. The two inner flaps 18 can be conveniently grasped by the user in fitting the cover over a mattress 21, as illustrated in Fig. 3; this is accomplished by turning the fastener halves outwardly so that the same will not come into contact with the mattress in the course of this operation. When the cover is closed, the slide-fastener halves 13a, 13b are substantially parallel with and between the upper and lower horizontal edges 21a, 21b of the mattress 21 (see Fig. 4) and the internal flaps 18 are between the mattress and the stops 13d (see Fig. 5), which prevents entry or escape of dust even if the slider 13c is not drawn all the way to the stop.

Figure 7:
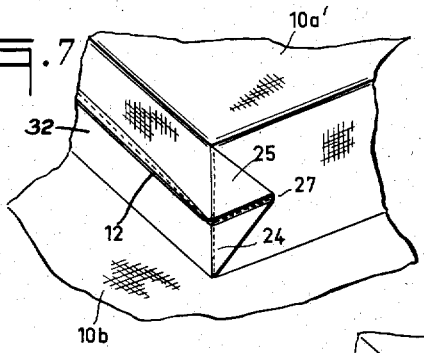
Fig. 7 is an inside view of a finished rear corner.
Figure 8:
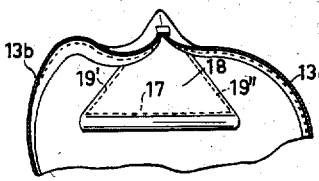
Fig. 8 is an inside view of one of the box corners at the forward end of the cover.
Figure 6:
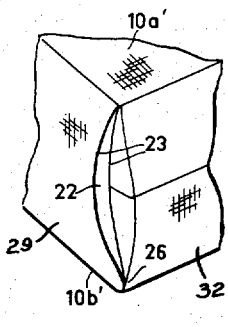
Fig. 6 is a perspective view of a semi-finished rear corner of the cover.

The rear end of the cover is illustrated in Figs. 6 and 7. The material is first spread to a width substantially equaling the thickness of the mattress and is then folded inwardly to form a triangular pocket 22 whose adjacent vertical edges 23 are subsequently joined by an internal seam 24. The resulting rear flap 15 is similar to front flap 18 and defines a triangle whose base, along seam 24, forms one of the vertical edges 26 of the mattress cover.

In use, the cover 10 closely follows the contours of the mattress as the front flaps 18 are attached to the side panels 29, 30 and the rear flaps 25 are hidden in the cover. It will be seen that the apex 28 of each triangular front flap 18, formed by one of the two common front corners of cover halves 10a and 10b, extends outwardly from triangle base 17 whereas the apex 27 of each rear flap 25, formed by one of the two common rear corners of the cover halves, is directed inwardly from the corresponding base 24. As a result of this difference, flap 18 requires stitching 19', 19'' on the sides while flap 25 does not. Seam 17 only serves to retain the reinforcing member 15 and is not essential to the continuity of the structure, hence tension may be exerted upon flaps 18, as when pulling the cover over the mattress, without risk of damage to the fabric. It will also be noted that flaps 18 help to relieve any undue strain upon slide fastener 13.

The seams of my improved cover, whether hidden or not, might yield upon prolonged use but will still leave the mattress 21 or other protected article unexposed since the material of the cover below the seams is only folded and will thus fully cover the article. The flexible member 15 may be omitted in covers for sofa pillows or other relatively small articles since its primary purpose is to facilitate the fitting of the cover over bulky mattresses.

The preferred embodiment of my novel cover has been shown and described for purposes of explanation only and is not to be construed in a limitative sense, as various changes and modifications will occur to persons skilled in the art within the spirit and scope of my invention defined in the appended claims.

I claim:

1. A cover for a mattress or the like, comprising a substantially prismatic integral body with an upper and a lower panel, a front panel, a rear panel and two side panels defining two front box corners and two rear box corners with said upper and lower panels, each of said front corners being provided with a triangular front flap consisting of two registering, triangular flap halves each integrally extending from both said upper and lower panels, each front flap having a base along the common edge of said front panel and a respectively adjacent side panel and having its apex directed backwardly along the respective side panel, each front flap registering with and being concealed by a triangular area of said respective side panel, each of said rear corners being formed of a triangular rear flap having a base along the common edge of said rear panel and a respectively adjacent side panel and extending inwardly from its base, said front panel having an entrance slot extending from one front corner to the other and onto said side panels toward the apices of said triangular areas, the base of each front flap being accessible through said slot.

2. A cover according to claim 1, wherein said panels and flaps are all integral with one another.

3. A cover according to claim 1, comprising slide-fastener halves lining said entrance slot and extending onto said front flaps.

4. A cover according to claim 1, wherein each of said front flaps is provided with *a* flexible, elongated reinforcing member[s] imbedded therein and extending along its base.

5. A cover according to claim 4, further comprising stitching positioned wholly inside said body and holding said halves of each of said flaps together.

*6. A cover for a mattress or the like, comprising a substantially prismatic integral body with an upper and a lower panel, a front panel, a rear panel and two side panels defining two front box corners being provided with a triangular front flap consisting of two registering, triangular flap halves each integrally extending from both said upper and lower panels, each front flap having a base along the common edge of said front panel and a respectively adjacent side panel and having its apex directed backwardly along the respective side panel, each front flap registering with and being concealed by a triangular area of said respective side panel, said front panel having an entrance slot extending from one front corner to the other and onto said side panels toward the apices of said triangular areas, the base of each front flap being accessible through said slot.*

*7. A cover according to claim 6, wherein said panels and flaps are all integral with one another.*

*8. A cover according to claim 6, comprising slide-fastener halves lining said entrance slot and extending onto said front flaps.*

*9. A cover according to claim 6, wherein each of said front flaps is provided with a flexible, elongated reinforcing member imbedded therein and extending along its base.*

*10. A cover according to claim 9, further comprising stitching positioned wholly inside said body and holding said halves of each of said flaps together.*

References Cited in the file of this patent or the original patent

UNITED STATES PATENTS

| | | |
|---|---|---|
| 2,123,454 | Doppelt | July 12, 1938 |
| 2,503,746 | Klehr | Apr. 11, 1950 |
| 2,542,477 | Cart | Feb. 20, 1951 |
| 2,612,646 | Sussman | Oct. 7, 1952 |
| 2,639,444 | Monsabert | May 26, 1953 |